United States Patent
Dittmer

(10) Patent No.: US 7,380,760 B2
(45) Date of Patent: Jun. 3, 2008

(54) SELF-BALANCING ADJUSTABLE MOUNTING SYSTEM WITH FRICTION ADJUSTMENT

(75) Inventor: Jay Dittmer, Prior Lake, MN (US)

(73) Assignee: CSAV, Inc., Savage, MN (US)

( * ) Notice: Subject to any disclaimer, the term of this patent is extended or adjusted under 35 U.S.C. 154(b) by 272 days.

(21) Appl. No.: 11/147,987

(22) Filed: Jun. 7, 2005

(65) Prior Publication Data

US 2006/0022102 A1 Feb. 2, 2006

Related U.S. Application Data

(63) Continuation-in-part of application No. 10/449,834, filed on May 30, 2003, now Pat. No. 7,028,961.

(51) Int. Cl.
*E04G 3/00* (2006.01)
(52) U.S. Cl. .............. 248/278.1; 248/282.1; 248/288.31; 248/921; 403/22
(58) Field of Classification Search ............ 248/181.1, 248/663, 288.31, 288.51, 917, 919–923, 248/278.1, 282.1, 349.1, 276.1; 403/22, 403/90; 361/681; 439/162; 269/75
See application file for complete search history.

(56) References Cited

U.S. PATENT DOCUMENTS

| | | | | |
|---|---|---|---|---|
| 1,320,775 | A | * | 11/1919 | Mather .................. 248/288.51 |
| 1,646,379 | A | * | 10/1927 | Whitehead .................. 248/481 |
| 4,483,503 | A | | 11/1984 | Gahan |
| 4,549,710 | A | | 10/1985 | Prince et al. |
| 4,554,590 | A | | 11/1985 | Chelin et al. |
| 4,621,782 | A | | 11/1986 | Carlson et al. |
| 4,708,312 | A | | 11/1987 | Rohr |
| 4,768,744 | A | | 9/1988 | Leeds et al. |
| 4,836,478 | A | | 6/1989 | Sweere |
| 4,836,486 | A | | 6/1989 | Vossoughi et al. |

(Continued)

FOREIGN PATENT DOCUMENTS

WO WO 03/050786 A1 6/2003

OTHER PUBLICATIONS

NEC/Mitsubishi LCT 1880SX Outline Drawing; Rev. 1, Oct. 2001, pp. 1.

(Continued)

*Primary Examiner*—Korie H. Chan
(74) *Attorney, Agent, or Firm*—Patterson, Thuente, Skaar & Christensen, PA

(57) ABSTRACT

A self-balancing adjustable mounting system for a flat panel display. A display interface having a hollow, frusto-spherical shell portion is attached to the flat panel display. The display interface is received in a guide structure that has a bearing portion engaging the outer surface of the frusto-spherical shell, and a second bearing portion engaging the inner surface of the frusto-spherical shell. The frusto-spherical shell is guided between the first and second bearing portions so that the flat panel display and device interface are generally rotatable about the center of the radius of curvature of the semi-spherical shell. A friction adjustment mechanism enables selective adjustment of the amount of friction between the first and second bearing portions and the frusto-spherical shell so as to enable the flat panel display to be fixed in a position to inhibit undesired movement of the display due to contact or other cause.

13 Claims, 14 Drawing Sheets

U.S. PATENT DOCUMENTS

| | | |
|---|---|---|
| 4,844,387 A | 7/1989 | Sorgi et al. |
| 4,880,191 A | 11/1989 | Lake, Jr. |
| 4,989,813 A | 2/1991 | Kim et al. |
| 5,037,050 A | 8/1991 | Lin et al. |
| 5,102,082 A | 4/1992 | Bang |
| 5,209,446 A | 5/1993 | Kawai |
| 5,277,392 A | 1/1994 | Rossman et al. |
| 5,398,901 A | 3/1995 | Brodmann et al. |
| 5,404,182 A | 4/1995 | Nomura |
| 5,553,820 A | 9/1996 | Karten et al. |
| 5,603,478 A | 2/1997 | Wang |
| 5,632,463 A | 5/1997 | Sung et al. |
| 5,687,939 A | 11/1997 | Moscovitch |
| 5,687,944 A | 11/1997 | Shon |
| 5,732,922 A | 3/1998 | Jeon |
| 5,743,503 A | 4/1998 | Voeller et al. |
| 5,842,672 A | 12/1998 | Sweere et al. |
| 5,876,008 A | 3/1999 | Sweere et al. |
| 5,918,841 A | 7/1999 | Sweere et al. |
| 5,918,845 A | 7/1999 | Whitaker |
| 5,923,528 A | 7/1999 | Lee |
| 5,924,665 A | 7/1999 | Sweere et al. |
| 5,947,429 A | 9/1999 | Sweere et al. |
| 5,992,809 A | 11/1999 | Sweere et al. |
| 6,000,560 A | 12/1999 | Barkan |
| 6,012,693 A | 1/2000 | Voeller et al. |
| 6,015,120 A | 1/2000 | Sweere et al. |
| 6,047,939 A | 4/2000 | Kim |
| 6,119,997 A * | 9/2000 | Van Lieshout ............... 248/323 |
| RE36,978 E | 12/2000 | Moscovitch |
| 6,189,842 B1 | 2/2001 | Bergeron Gull et al. |
| 6,273,383 B1 | 8/2001 | Oddsen, Jr. |
| 6,402,109 B1 | 6/2002 | Dittmer |
| 6,409,134 B1 | 6/2002 | Oddsen, Jr. |
| 6,454,234 B1 | 9/2002 | Westbrook |
| 6,478,274 B1 | 11/2002 | Oddsen, Jr. |
| 6,505,988 B1 | 1/2003 | Oddsen, Jr. |
| 6,510,049 B2 | 1/2003 | Rosen |
| 6,695,270 B1 | 2/2004 | Smed |
| 6,874,743 B2 | 4/2005 | Watanabe et al. |
| 6,905,101 B1 | 6/2005 | Dittmer |
| 6,966,532 B2 | 11/2005 | Ishizaki et al. |

OTHER PUBLICATIONS

NEC MultiSync LCD 1880SX Quick Start Guide; Jan. 16, 2002, pp. 2.

Declaration of Bradley J. Thorson (includes Exhibit A), Oct. 5, 2006, pp. 9.

* cited by examiner

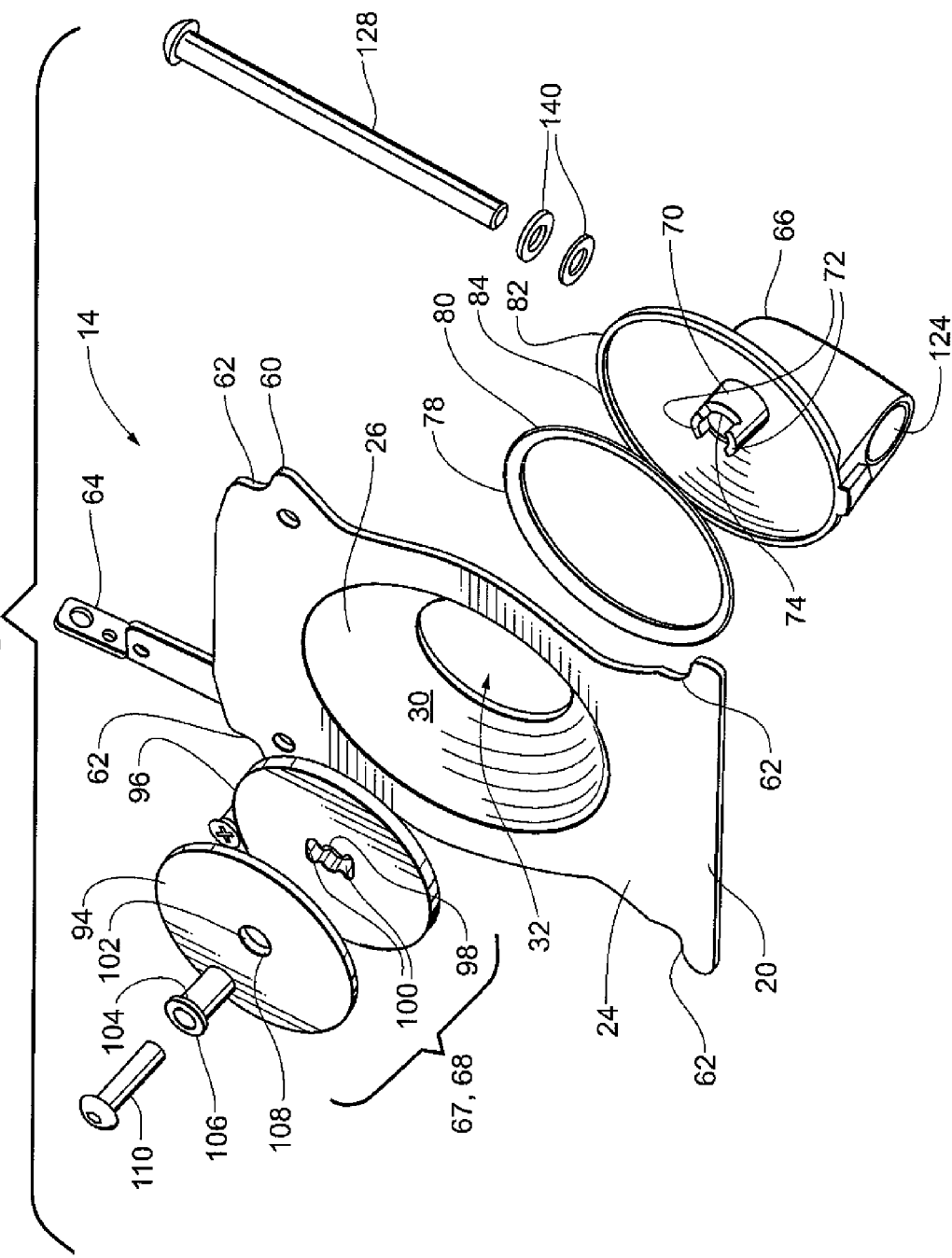

SELF-BALANCING ADJUSTABLE MOUNTING SYSTEM WITH FRICTION ADJUSTMENT

RELATED APPLICATIONS

This application is a continuation-in-part of U.S. patent application Ser. No. 10/449,834, entitled SELF-BALANCING ADJUSTABLE FLAT PANEL MOUNTING SYSTEM, filed May 30, 2003, now U.S. Pat. No. 7,028,961 hereby fully incorporated herein by reference.

FIELD OF THE INVENTION

The present invention is directed to mounts for electronic displays and more specifically to devices for mounting flat panel electronic displays such as plasma and LCD screens on a vertical structure.

BACKGROUND OF THE INVENTION

Flat panel displays have become an increasingly popular substitute for projection devices and CRTs. The flat panel display is typically mounted on a structure, such as a wall. Flat panel displays, especially LCD displays, are typically most clearly viewable from a position directly in front of the display. The display image is often too dark or not visible at all if viewed from a significant angle.

It is thus preferable that the angle of a flat panel display can be adjusted for optimum viewing. Various prior art positioning devices have been used, such as friction based hinges, mechanical linkages with springs or other biasing devices, and various mechanical latches. The friction based devices need to be sufficiently strong to hold a relatively heavy flat panel displays, while being easy to operate.

Traditional friction based devices and mechanical latches often require one person to hold the flat panel display at the correct angle, while a second person adjusts the device. Movement in the upward direction requires the operator to lift a substantial portion of the weight of the flat panel display. In some instances, the operator must also overcome the resistance of the positioning device.

Also, the hinge and pivot joints used in prior devices typically enable positioning of the display about only one axis per joint. The degree of display position adjustability of such devices is limited by the number of joints that can be economically and practically provided.

Mechanical linkages with springs are expensive to build. For example, U.S. Pat. No. 6,419,196 (Sweere et al.) discloses a multi-jointed, pivoted support arm to support and position a flat panel display that uses a nitrogen gas spring counterbalance mechanism. What is needed in the industry is a low-cost, easy to operate, and relatively maintenance free system for mounting and positioning flat panel displays that also offers a high degree of adjustability for display positioning.

BRIEF SUMMARY OF THE INVENTION

The present invention is a mounting system for a flat panel display that substantially meets the aforementioned needs of the industry. A display interface having a hollow, semi-spherical shell portion is attached to the flat panel display. The semi-spherical shell is formed with a generally constant radius of curvature. The center of the radius of curvature is disposed proximate the center of gravity of the flat panel display with the display interface attached. The display interface is received in a guide structure that has a bearing portion engaging the outer surface of the semi-spherical shell, and a second bearing portion engaging the inner surface of the semi-spherical shell through an aperture formed in the semi-spherical shell. The semi-spherical shell is guided between the first and second bearing portions so that the flat panel display and device interface are generally rotatable about the center of the radius of curvature of the semi-spherical shell.

The above described configuration enables the flat panel display to be positioned in a virtually infinite number of positions within the range of travel of the semi-spherical shell within the mount. The location of the center of rotation of the display proximate the center of gravity of the display and device interface enable self-balancing so that a virtually equal effort is required to position the display in any position, and with a relatively low effort so that positioning can be accomplished by an individual user.

In accordance with the invention, a self-balancing adjustable flat panel electronic display system adapted for mounting on a fixed structure is provided. The system includes a support structure adapted to attach to the fixed structure, and a flat panel electronic display device with a device interface portion thereon. The flat panel display device and the device interface portion together have a center of gravity. The device interface portion includes a semi-spherical portion having an outer surface with a generally constant radius of curvature with a center proximate the center of gravity. The system also includes a guide portion operably coupled to the device interface portion and the support structure. The guide portion has a first bearing portion engaging and guiding the outer surface of the semi-spherical portion and a retaining portion for retaining the device interface portion in engagement with the first bearing portion. The flat panel display and the device interface portion are rotatable about the center of the radius of curvature of the semi-spherical portion.

In an embodiment, a friction adjustment mechanism enables selective adjustment of the amount of friction between the first and second bearing portions and the frusto-spherical shell so as to enable the flat panel display to be fixed in a position to inhibit undesired movement of the display due to contact or other cause.

BRIEF DESCRIPTION OF THE DRAWINGS

FIG. 3 is an exploded view, from an interior perspective, of the mount portion of the mounting system;

DETAILED DESCRIPTION OF THE INVENTION

Figure 1:
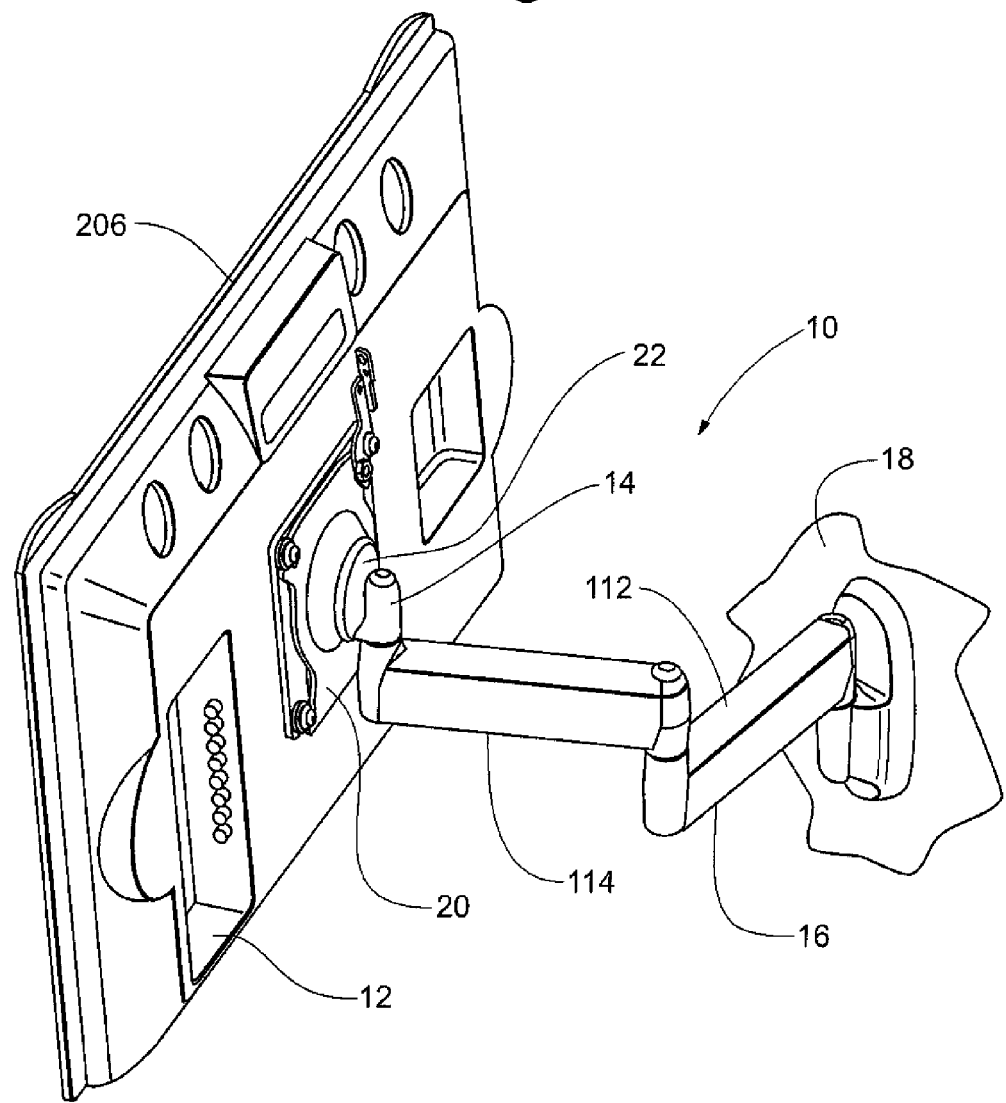
FIG. 1 is a rear perspective view of a flat panel display and mounting system of the present invention.

A self-balancing adjustable mounting system 10 of the present invention is depicted in FIGS. 1-8. The system 10 generally includes a flat panel display 12, a mount 14 and a support structure 16. Support structure 16 is attachable to any fixed structure such as wall 18.

Mount 14 generally includes device interface 20 and guide structure 22. Device interface 20 generally includes a mounting plate portion 24 and a semi-spherical shell portion 26. The semi-spherical shell portion 26 has an outer surface 28, an inner surface 30 and an aperture 32 formed through the shell 26. Semi-spherical shell portion 26 has a generally constant radius of curvature 34 defined from a common center 36 over all curved portions of the shell 26.

Mounting plate 24 is removably attachable to flat panel display 12. Threaded fasteners 38 extend through slots 40 in adapter plate 42 and thread into holes 44 in flat panel display 12. Slots 40 enable adapter plate 42 to be vertically positionable on flat panel display 12 so as to allow for positioning of center 36 near the center of gravity of the display, as will be further discussed herein below. Alternate slots 46 may be provided to enable adapter plate 42 to mate with a flat panel displays 12 of various manufacture and model, which may have an alternate positioning of holes 44.

Fastening buttons 48 are secured to adapter plate 42 with fasteners 50. Fastening buttons 48 have a head portion 52, a base portion 54, and a narrow shank portion 56, defining a slot 58. Slot 58 is dimensioned so as to receive the edge 60 of mounting plate 24. Mounting plate 24 has a plurality of notches 62 corresponding with the location of fastening buttons 48. Notches 62 are located so that mounting plate 24 may be slid into position with notches 62 engaged with shank portion 56 of each fastening button 48, and with the edges of mounting plate 24 captured between head portion 52 and base portion 54 of each fastening button 48. With mounting plate 24 in this position, latch mechanism 64 may be pivoted into position over head portion 52 of one of the fastening buttons 48, thereby securing mounting plate 24 in position. In addition to the arrangement described above, any other suitable arrangement for attaching mounting plate 24 to flat panel display 12 may be used, including fasteners directly securing mounting plate 24 to flat panel display 12.

Figure 3A:
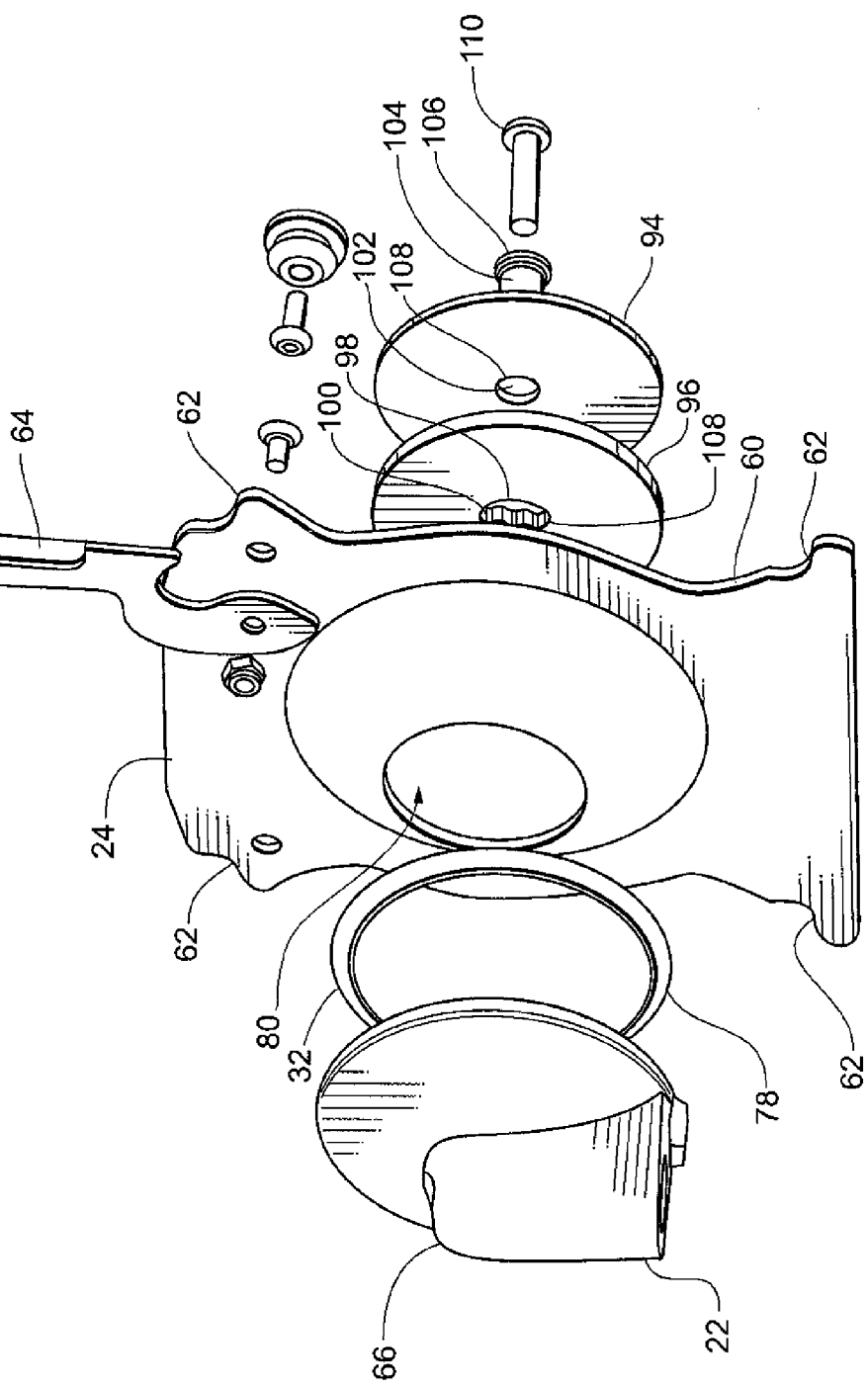
FIG. 3A is an exploded view, from an exterior perspective, of the mount portion of the mounting system.
Figure 4:
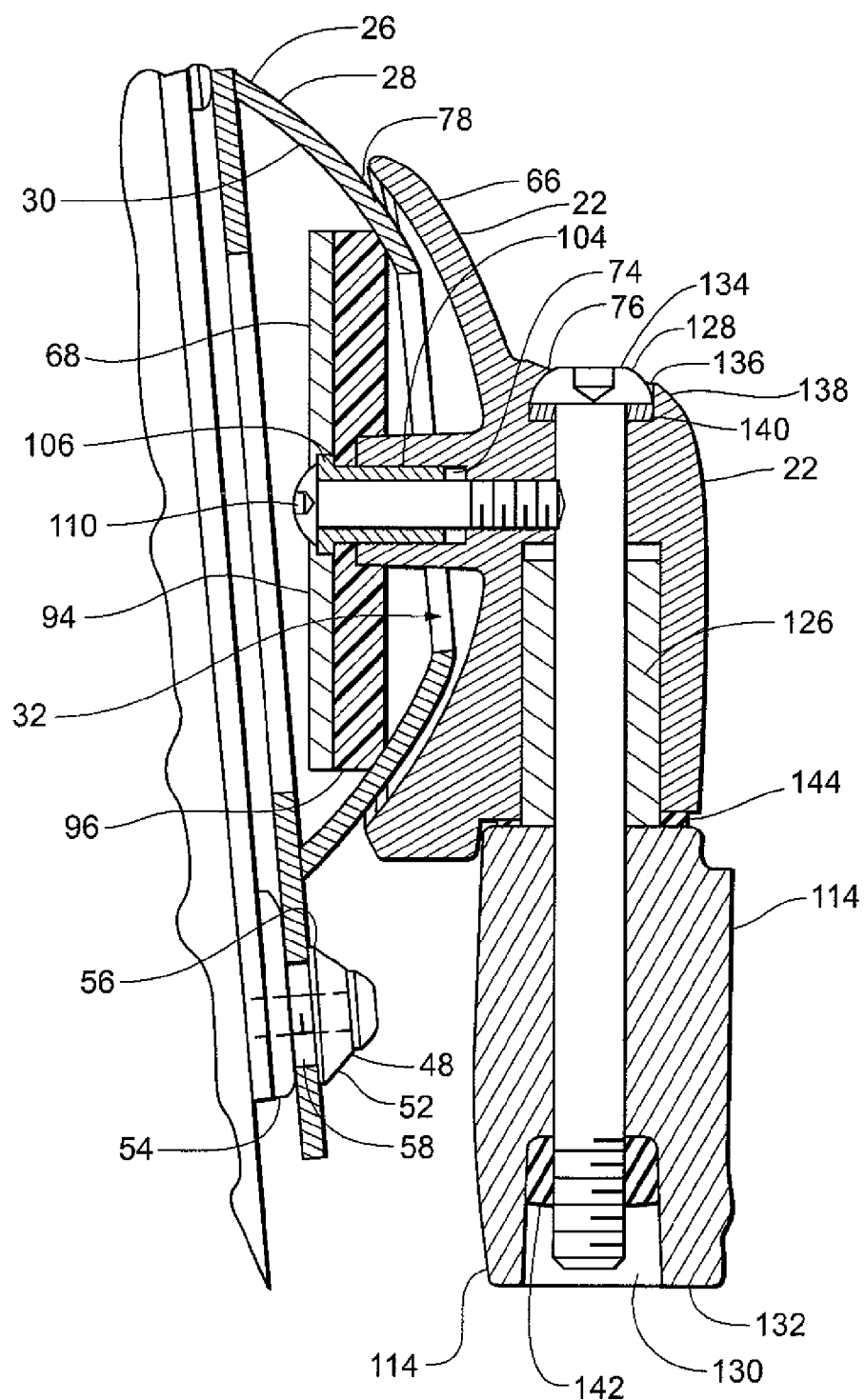
FIG. 4 is a cross-sectional view of the mount portion.
Figure 5:
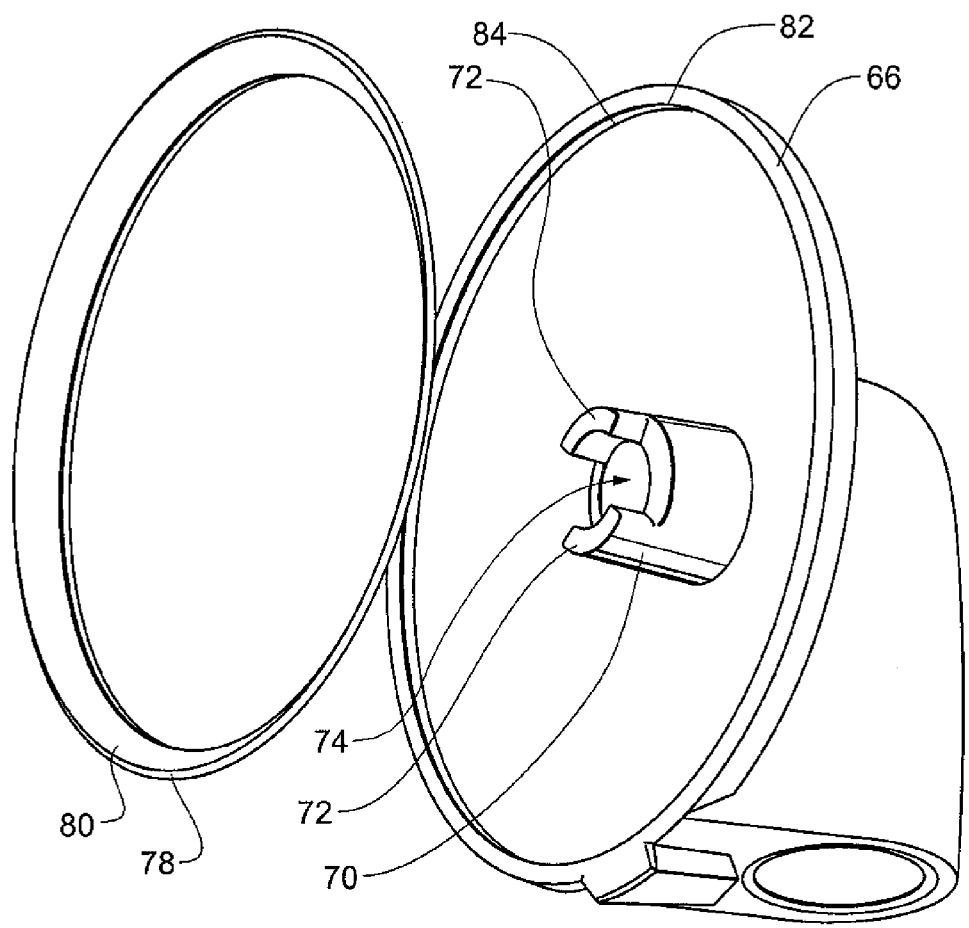
FIG. 5 is a perspective exploded view of the outer guide portion of the mount.

Guide structure 22 generally includes an outer guide portion 66 and a retaining portion 67 in the form of inner guide portion 68. Outer guide portion 66 has a boss 70 with a pair of projecting prongs 72. Boss 70 extends through aperture 32 in semi-spherical shell portion 26. Boss 70 has a bore 74 with an interior threaded portion 76. Outer guide portion 66 also has at least one bearing portion 78, which contacts the outer surface 28 of semi-spherical shell portion 26 and serves to guide rotating movement of device interface 20 and flat panel display 12. As depicted in FIGS. 3 and 5, bearing portion 78 may be a circular strip 80 fitted inside a lip 82 at the periphery 84 of outer guide portion 66. In this embodiment, bearing portion 78 is in sliding engagement with outer surface 28. Although bearing portion 78 may be made from any material having suitable friction and durability characteristics, it is presently preferred that ultra high molecular weight polyethylene (UHMWPE) be used for its superior lubricity, abrasion resistance, toughness, and freedom from stress cracking.

Figure 7:
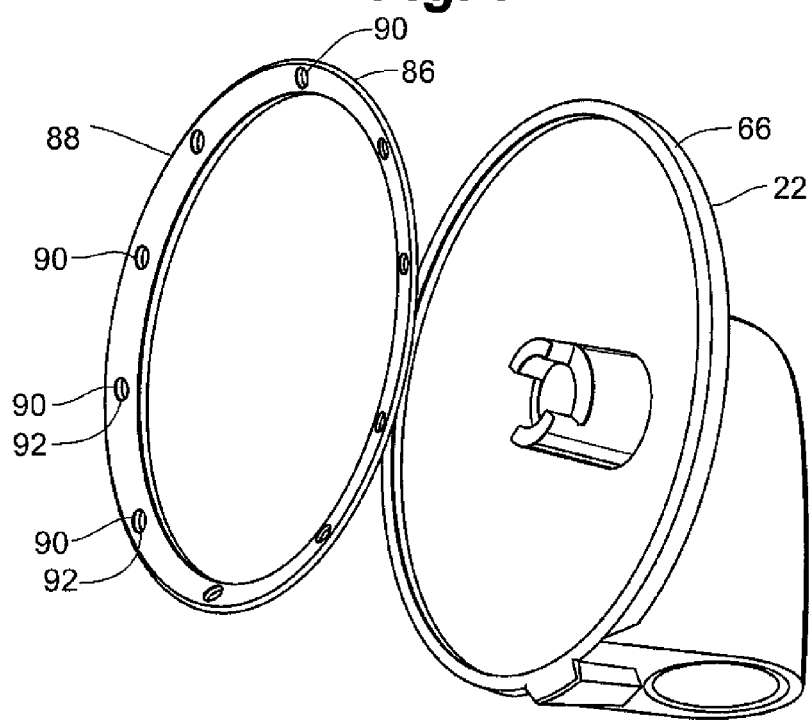
FIG. 7 is a perspective exploded view of an alternative embodiment of the outer guide portion of the mount.

As an alternative to frictional contact of bearing portion 78 with outer surface 28, a ball bearing mechanism 86 may be used in place of bearing portion 78 to provide rolling contact. As depicted in FIG. 7, ball bearing mechanism 86 generally includes a race portion 88 containing a plurality of ball bearings 90. Ball bearings 90 roll within sockets 92 in race portion 88.

Inner guide portion 68 generally includes retainer plate 94 and bearing portion 96. Bearing portion 96 has a center aperture 98 with a pair of lobes 100, which are conformingly shaped so as to receive prongs 72 of boss 70. Retainer plate 94 fits over bearing portion 96 and has a center aperture 102. Bushing 104 fits through center aperture 102 of retainer plate 94 and center aperture 98 of bearing portion 96, extending into bore 74 of boss 70. Bushing 104 has a lip 106 which engages an edge 108 of retainer plate 94. Fastener 110 extends through bushing 104 and threads into threaded portion 76 or boss 70, thereby securing inner guide portion 68 to outer guide portion 66.

Bearing portion 96 slidably engages inner surface 30 of semi-spherical shell portion 26 and serves as an additional guide for rotation of device interface 20 and the attached flat panel display 12. It is preferred that, in the depicted sliding contact embodiment, bearing portion 96 be formed from UHMWPE material for its especially desirable properties in this application. Again, it is anticipated that other suitable mechanisms, such as a ball bearing arrangement providing roller contact, could also be used in this configuration.

Figure 2:
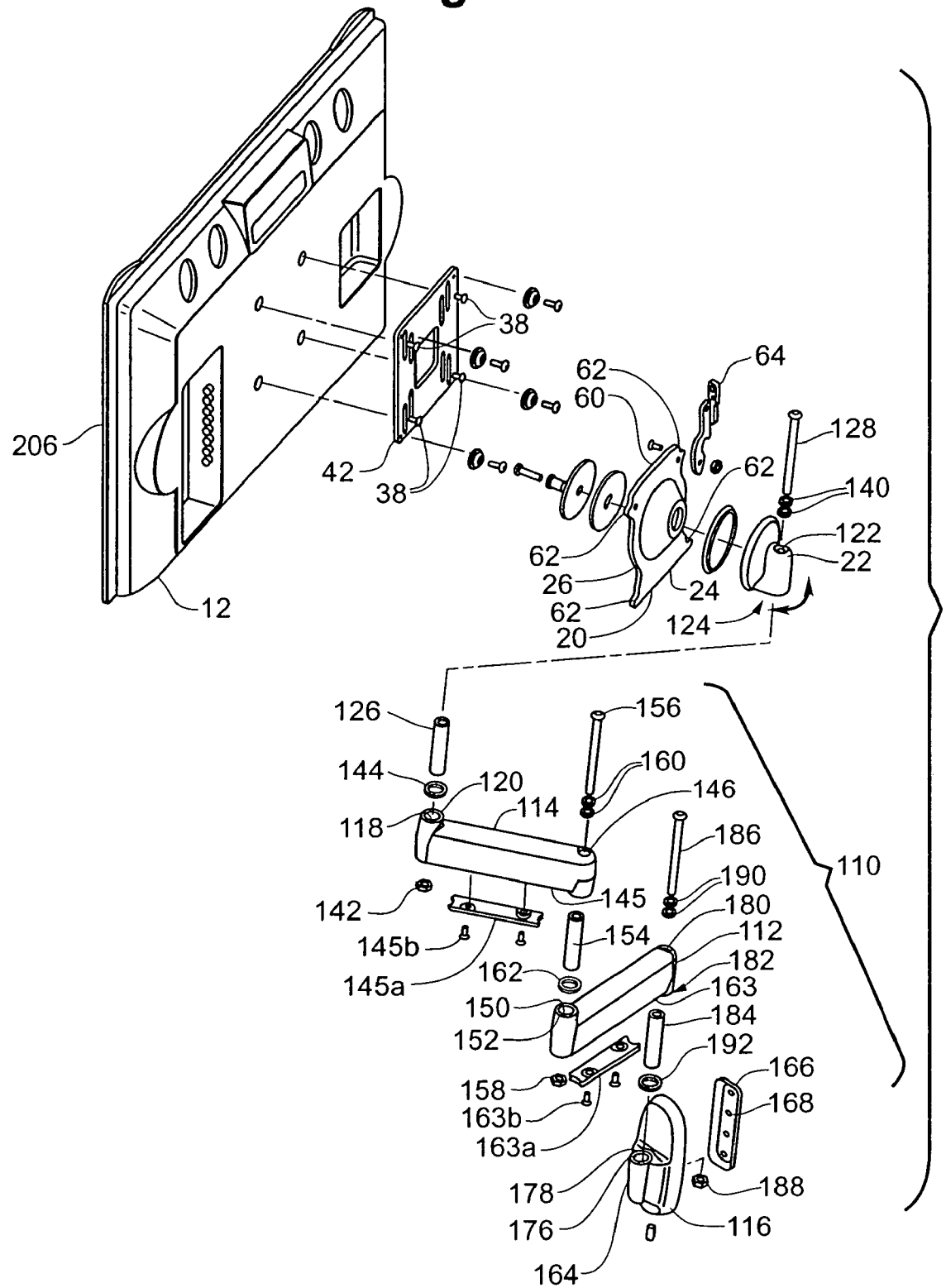
FIG. 2 is an exploded view of the display and mounting system depicted in FIG. 1.
Figure 2A:
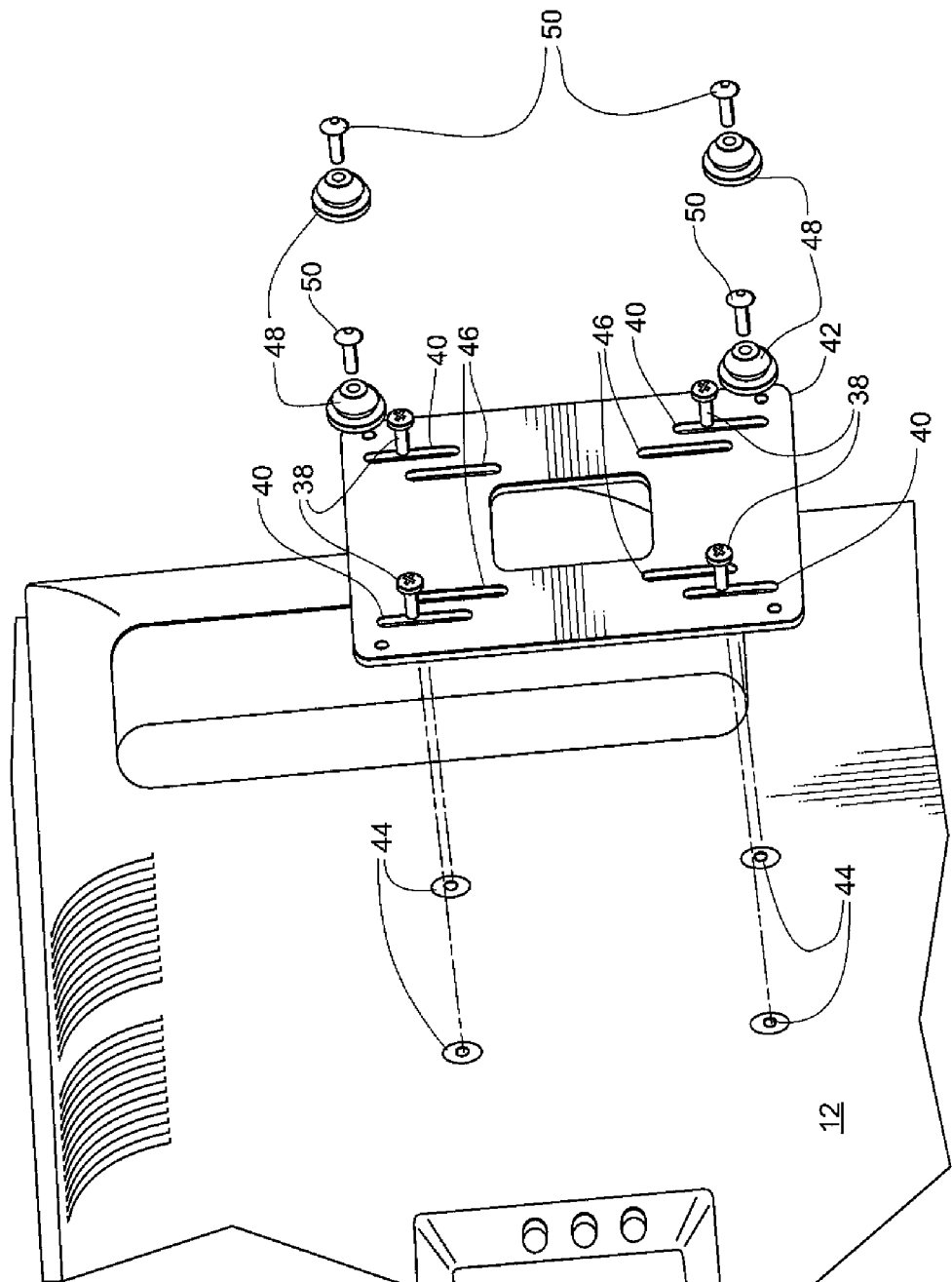
FIG. 2A is a perspective view of an adapter plate for attaching a flat panel display to the mounting system.

Mount 14 may be made so as to be attachable to any suitable support structure 16. As depicted in FIGS. 1 and 2, support structure 16 may be a swing arm assembly 110. Swing arm assembly 110 generally includes an inner arm 112, an outer arm 114 and a mounting bracket 116. Outer arm 114 has a bore 118, with an upwardly directed enlarged portion 120. Guide structure 22 has a corresponding bore 122 with a downwardly directed enlarged portion 124. Bushing 126 fits into enlarged portions 120 and 124 and is rotatable therein. Mount 14 is thus horizontally rotatably adjustable with respect to outer arm 114, as indicted by the arrows in FIG. 2.

Fastener 128 extends through bore 118, bushing 126 and bore 122, emerging in recess 130 at bottom side 132 of outer arm 114. Fastener 128 has head 134, which is received in recess 136 formed in top side 138 of guide structure 22. One or more friction washers 140 may be provided between head 134 and guide structure 22 so as to enable an adjustable amount of friction to be applied for resisting pivoting of guide structure 22 relative to outer arm 114. Nut 142 is threadably engaged with fastener 128 so as to permit application of axial pressure to friction washer 140 by tightening. Friction washer 144 may be provided between mount 14 and outer arm 114 to provide smooth rotation for the joint. Since the bottom side 145 of outer arm 114 is open, a bottom plate 145a may be affixed with fasteners 145b as depicted to enclose outer arm 114 for aesthetic purposes, and to retain any cables or wires that may be routed inside the arm.

A similar arrangement may be used to rotatably attach outer arm 114 to inner arm 112. Outer arm 114 has a bore 146 with a downwardly directed enlarged portion 148 (not depicted). Inner arm 112 has a bore 150 with an upwardly directed enlarged portion 152. Bushing 154 rotatably fits in enlarged portions 148 and 152. Fastener 156 extends through bores 146 and 150, as well as bushing 154. Fastener 156 may be secured in place with nut 158 to hold inner arm 112 and outer arm 114 together. One or more friction washers 160, 162, may be provided as before. Again, since the bottom side 163 of inner arm 112 is open, a bottom plate 163a may be affixed with fasteners 163b as depicted to enclose outer arm 112 for aesthetic purposes, and to retain any cables or wires that may be routed inside the arm.

Figure 8:
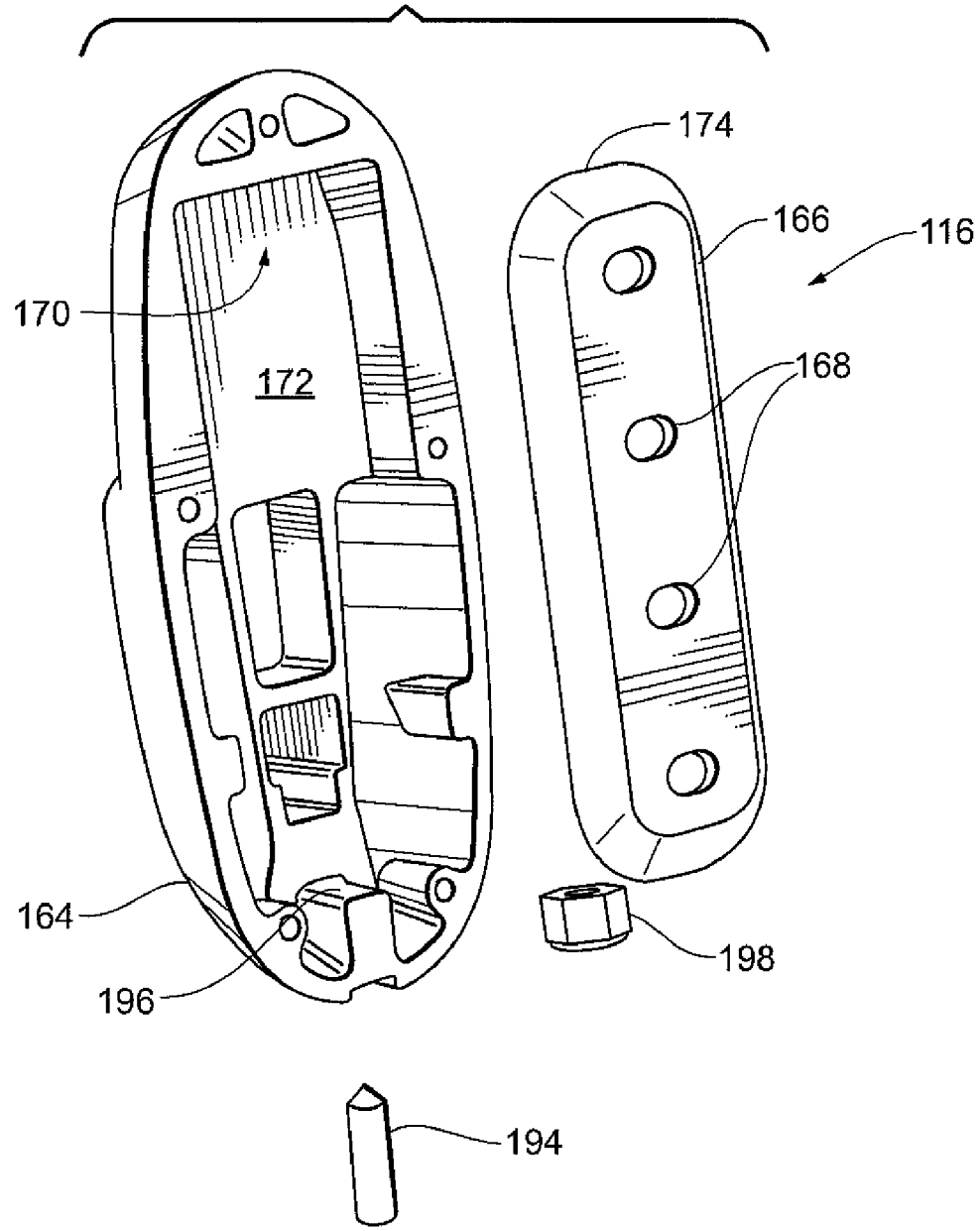
FIG. 8 is an exploded view of the mounting bracket portion of the mounting system.
Figure 9:
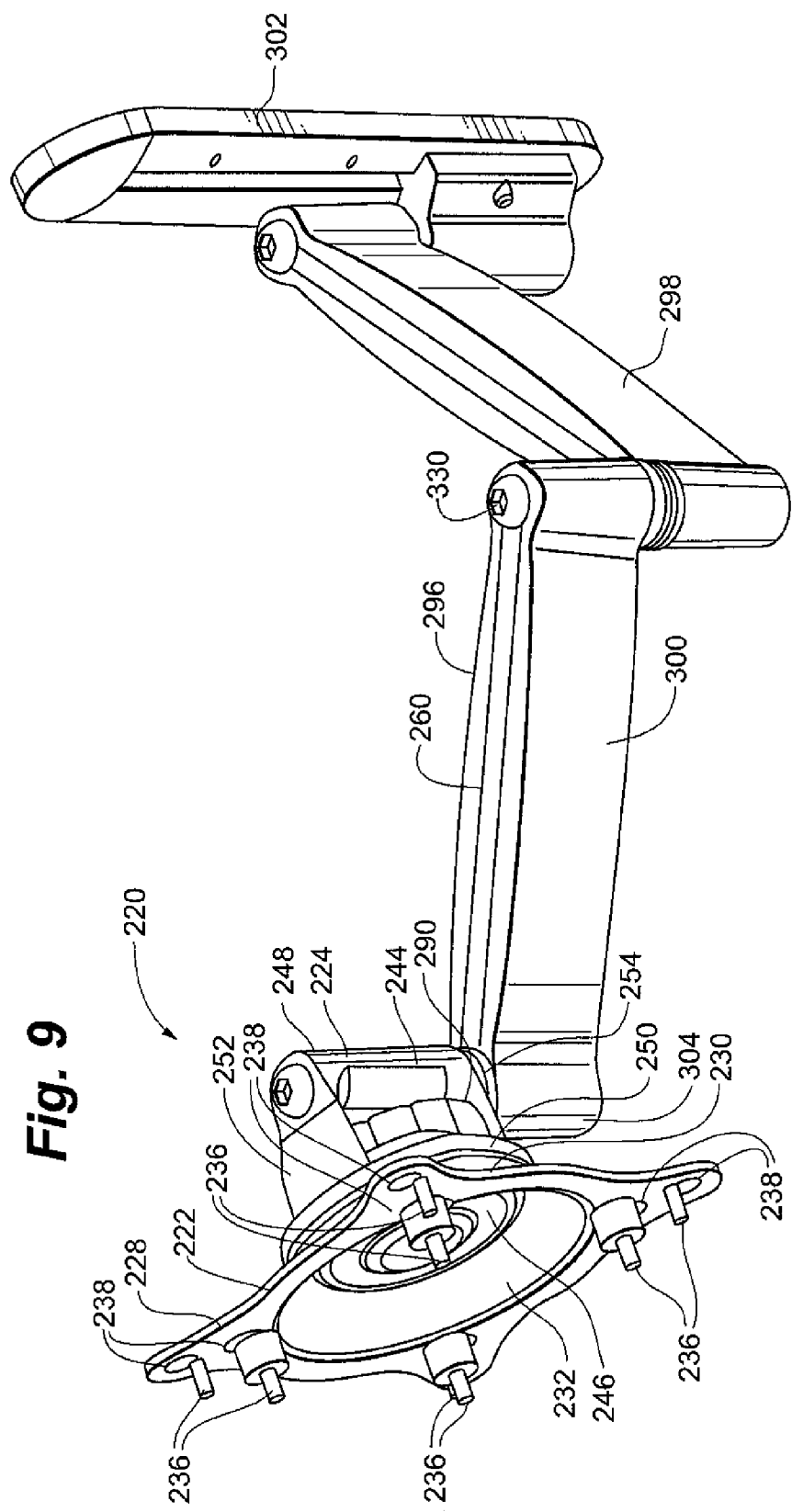
FIG. 9 is a perspective view of an alternative embodiment of the invention with a friction adjustment feature.

Mounting bracket 116 is depicted in FIG. 8, and generally includes bracket portion 164 and hanger plate 166. Hanger plate 166 may be secured to a fixed structure, such as a wall, using fasteners inserted through apertures 168. Bracket portion 164 has a groove 170 inside housing 172 for receiving edge 174 of hanger plate 166.

A swing arm, such as inner arm 112, may be secured to mounting bracket 116 with the same arrangement as described above for connecting inner arm 112 with outer arm 114. Bracket portion 164 has a bore 176 with an upwardly directed enlarged portion 178. Inner arm 112 has a bore 180 with a downwardly directed enlarged portion 182. Again, a bushing 184 rotatably fits in enlarged portions 178, 182. Fastener 186, nut 188, and friction washers 190, 192, secure the swing arm to the bracket.

Mounting bracket 116 may be secured to a fixed structure by first installing hanger plate 166 on the structure as described above. With the hanger plate 166 in place, housing 172 is placed over hanger plate 166 so as to cover it. The housing 172 is slid downward, thereby engaging edge 174 of hanger plate 166 in groove 170, and securing bracket portion 164 and hanger plate 166 together. Set screw 194, threaded through hole 196 and secured by nut 198 prevents upward sliding movement of bracket portion 164, thereby preventing disengagement of bracket portion 164 from mounting bracket 166.

Figure 6:
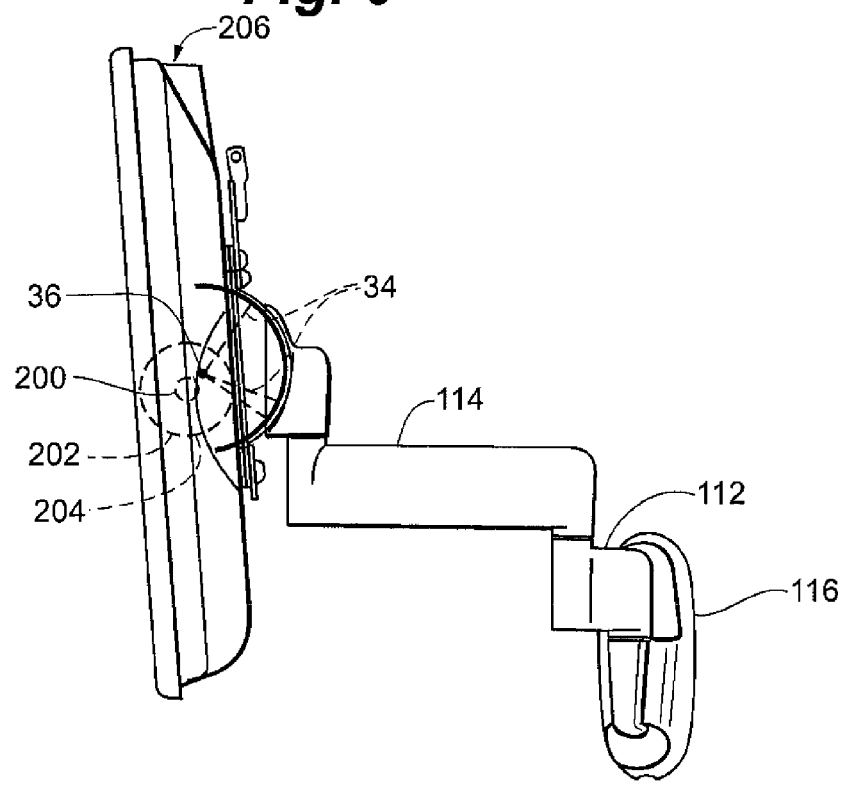
FIG. 6 is a side elevation view of a flat panel display and mount with an actual center of gravity and virtual center of gravity indicated thereon.

FIG. 6 illustrates, in exemplary fashion, a side view of a flat panel display 12 mounted to mount 14. The flat panel display 12 and the device interface 20 together have an actual center of gravity, annotated 200. As described above, semi-spherical shell portion 26 has a constant radius of curvature 34 with a common center 36. Device interface 20 is preferably positioned so that center 36 of radius of curvature 34 is located as closely as possible to the actual center of gravity 200.

Of course it will be readily appreciated that the location of actual center of gravity 200 will vary depending on the weight distribution of the particular flat panel display 12 attached to the mounting system. For purposes of the invention, a virtual center of gravity 202 may be approximated by a spherical volume 204 having actual center of gravity 200 at its center.

The operation of the invention may now be understood with reference to FIGS. 1-8. As described above, semi-spherical shell portion 26 is captured between an outer guide portion 66 and an inner guide portion 68 of guide structure 22. These guide portions 66, 68, have respective bearing portions 78, 96, that engage surfaces 28, 30, of semi-spherical shell 26. Semi-spherical shell 26 is movable between outer guide portion 66 and inner guide portion 68, guided by bearing portions 78, 96.

To adjust the position of flat panel display 12, a user may push or pull any portion of the periphery 206 of the flat panel display 12. The applied force causes flat panel display 12 and device interface 20 to rotate about center 36, as semi-spherical shell 26 passes between bearing portions 78, 96.

The location of center 36 within virtual center of gravity 202, proximate actual center of gravity 200, enables flat panel display 12 to be self-balancing, thus requiring no greater amount of effort for positioning in any particular direction. This configuration enables rotational movement in any direction within the range of travel of semi-spherical shell 26 within guide structure 22, thus enabling flat panel display 12 to be positioned in a virtually infinite number of orientations.

In some cases, it may be desirable to fix the position of the flat panel display relative to the support structure to prevent undesired movement, for example by unintentional contact. Referring to FIGS. 9-12, an alternative embodiment of the mount 220 of the present invention including a friction adjustment for selectively adjustably fixing the position of the flat panel display relative to the support structure to prevent undesired movement is depicted. Mount 220 generally includes device interface 222 and guide structure 224. Device interface 222 generally includes frusto-spherical shell portion 226 with laterally projecting flange 228. Frusto-spherical shell portion 226 presents outer surface 230, an inner surface 232 and has an aperture 234 formed therethrough. Frusto-spherical shell portion 226 may have a generally constant radius of curvature defined from a common center over all curved portions of the shell 226 as previously described.

Figure 10:
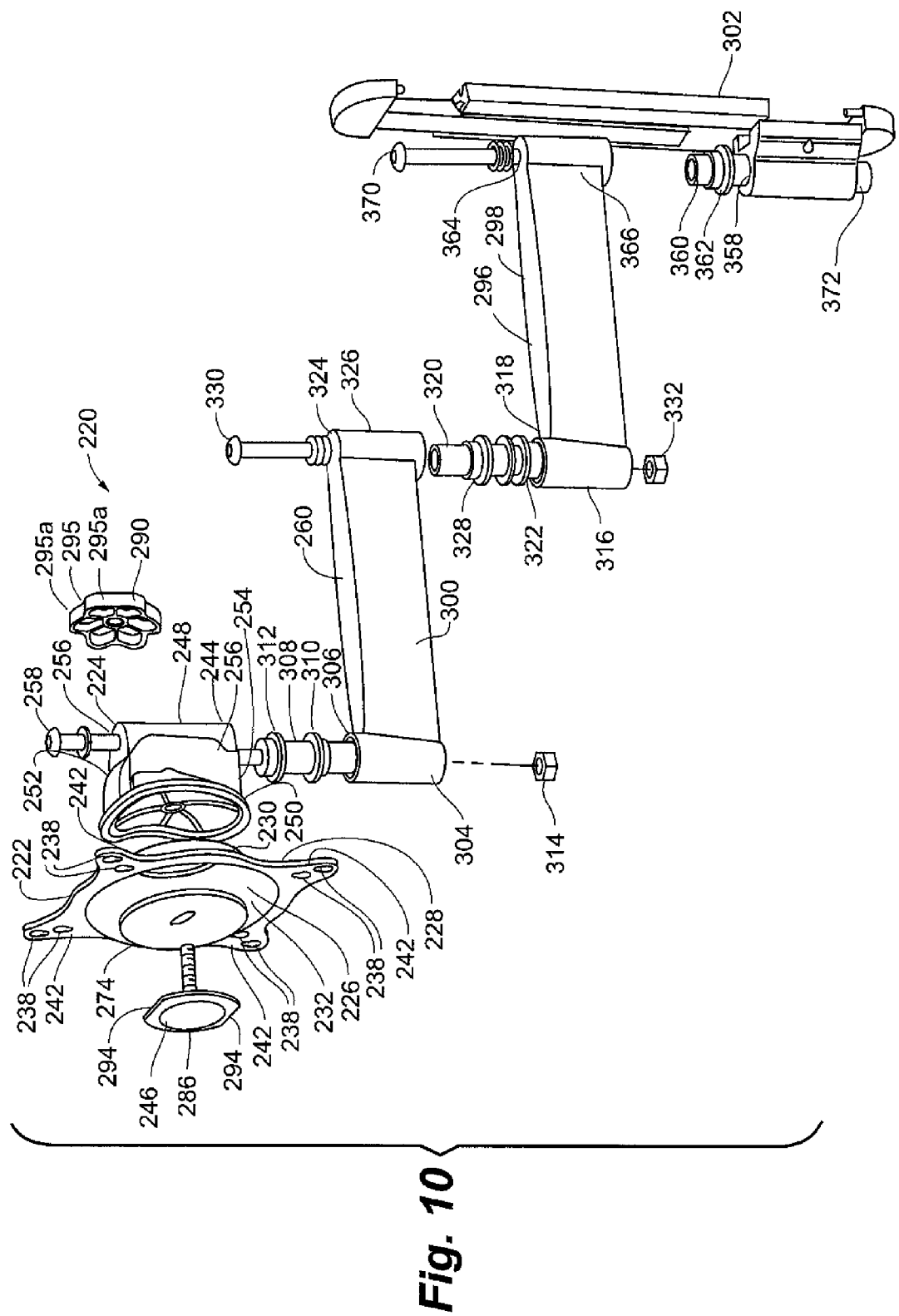
FIG. 10 is an exploded view of the embodiment depicted in FIG. 9.
Figure 11:
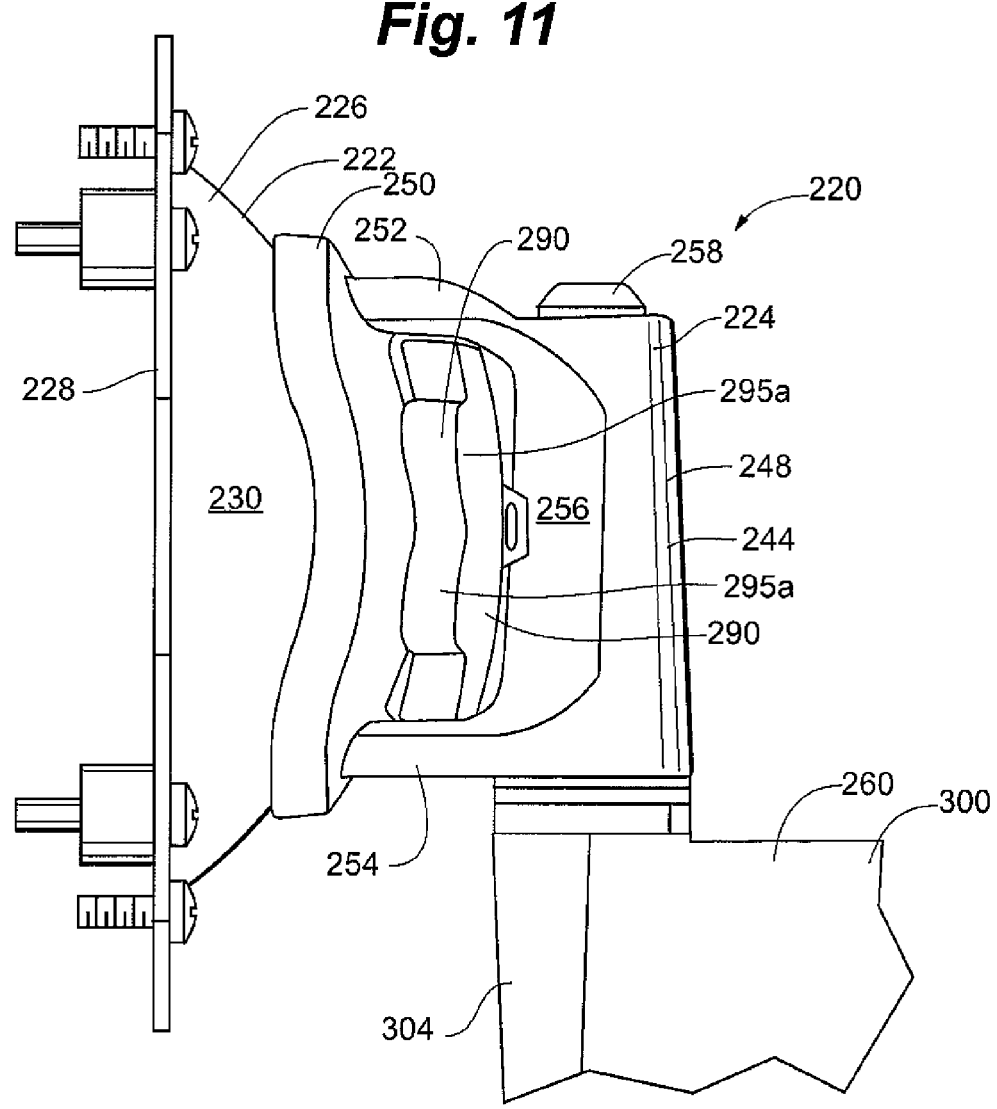
FIG. 11 is a fragmentary side elevation view of the device interface and guide structure portion of the embodiment of FIG. 9.

Flange 228 is removably attachable to a flat panel display 12. Threaded fasteners 236 extend through keyhole slots 238 in flange 228 and thread into corresponding holes in flat panel display 12. Spacers 240 may be provided on threaded fasteners 236 to enable flange 228 to be spaced apart from the flat panel display if desired. As depicted in FIG. 10, the narrowed portion 242 of keyhole slots 238 may face in towards each other on opposing sides of flange 228 to enable device interface 222 to be oriented in any desired orientation.

Guide structure 224 generally includes an outer guide portion 244 and a retaining portion 246. Outer guide portion 244 generally includes rear columnar portion 248 and cup portion 250 coupled by upper 252 and lower 254 bridge portions, defining an aperture 256. Columnar portion 248 has a bore 256 formed vertically therethrough for receiving bolt 258 to pivotally attach guide structure 224 to support structure 260 as previously described.

Figure 12:
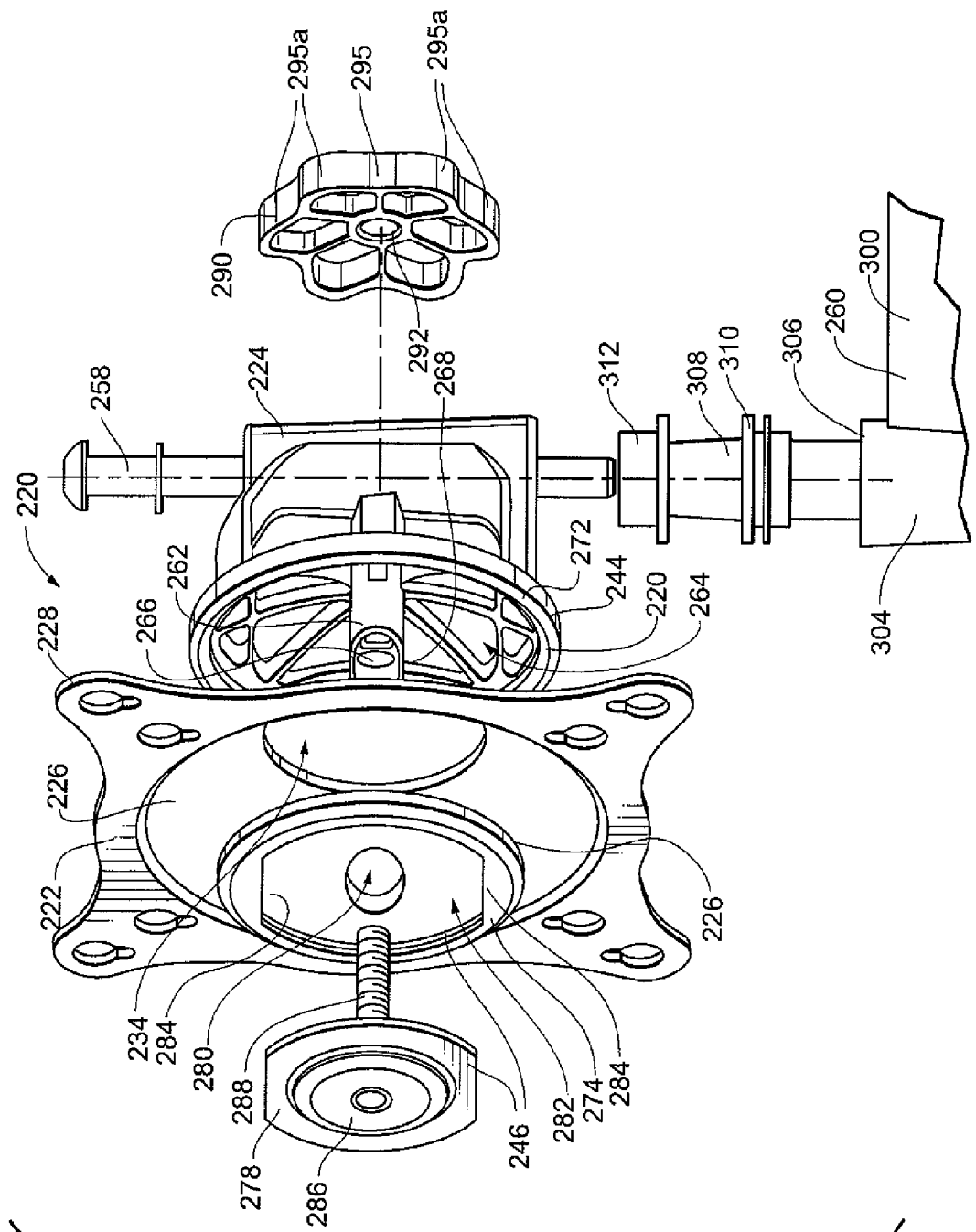
FIG. 12 is a fragmentary perspective view of the device interface and guide structure portion of the embodiment of FIG. 9.

Cup portion 250 has a central boss structure 262 projecting into recessed portion 264. Boss 262 may be provided with a generally oval cross section as depicted in FIGS. 10 and 12. Bore 266 extends through boss 262 from end 268 and terminating in aperture 256. Cup portion 250 further has bearing portion 270 extending around periphery 272 for contacting and guiding outer surface 230 of frusto-spherical portion 226.

Retaining portion 246 generally includes retainer plate 274 having inner bearing portion 276 and retainer bolt 278. Retainer plate 274 has an oval shaped central bore 280 defined therethrough for receiving the oval cross section of boss 262, thereby preventing rotation of retainer plate 274 on boss 262. Retainer plate 274 further has an outer recessed portion 282 with a pair of flats 284. Bolt 278 has plate head portion 286 and threaded shank 288. Threaded shank 288 extends through bore 280 of boss 262 and into aperture 256. Knob 290 has a threaded bore 292 which threadedly receives shank 288. Plate head portion 286 has flats 294 which engage with flats 284 to rotationally lock bolt 278 to retainer plate 274 and boss 262. Knob 290 presents a periphery 295 with a plurality of finger-grippable indentations 295a to facilitate rotation of knob 290.

In operation, knob 290 may be rotated in either rotational direction, threading on shank 288 of bolt 278. As a result, head 286 of bolt 278 causes retainer plate 274 to be either pulled in toward or pushed out away from cup portion 250 and bearing portion 270 depending on the direction of rotation of knob 290. Consequently, the clamping force exerted by bearing portion 270 of cup portion 250 and inner bearing portion 278 of retainer plate 274 is varied causing a proportional change in sliding friction between bearing portions 270, 276 and frusto-spherical portion 226. With knob 290 loosened so as to apply minimal clamping force on frusto-spherical portion 226, the flat panel display may be positionally adjusted to any desired position as described herein above, said positional adjustment made with substantially the same effort in any rotational direction owing to the location of the center of the radius of curvature of the frusto-spherical portion proximate the center of gravity of the flat panel display. When the desired position is reached, knob 290 may be tightened to clamp bearing portions 270, 276, tightly against the outer and inner surfaces of frusto-spherical portion 226, and increasing the frictional resistance to movement of the flat panel display relative to the support structure.

Again mount 220 may be made so as to be attachable to a suitable support structure 260 such as swing arm assembly 296. Swing arm assembly 296 generally includes an inner arm 298, an outer arm 300 and a mounting bracket assembly 302. Outer arm 300 has a distal end 304 with an upwardly directed bore 306. Shaft 308 is received in bushing 310 fitted in bore 306 and extends upwardly therefrom. Bore 256 of guide structure 224 has a downwardly directed enlarged portion which receives shaft 308 in a bushing 312. Bolt 258 extends through outer arm 300 and receives nut 314. Mount 220 is thus horizontally rotatably adjustable with respect to outer arm 300. Inner arm 298 is attached at each end to outer arm 300 and mounting bracket 302 in similar fashion so that inner arm is horizontally rotatably adjustable with respect to both outer arm 300 and mounting bracket 302. Inner arm 298 has a distal end 316 with an upwardly directed bore 318. Shaft 320 is received in bushing 322 fitted in bore 318 and extends upwardly therefrom. Bore 324 in proximal end 326 of outer arm 300 has a downwardly directed enlarged portion which receives shaft 320 in a bushing 328. Bolt 330 extends through outer arm 300 and receives nut 332.

Figure 13:
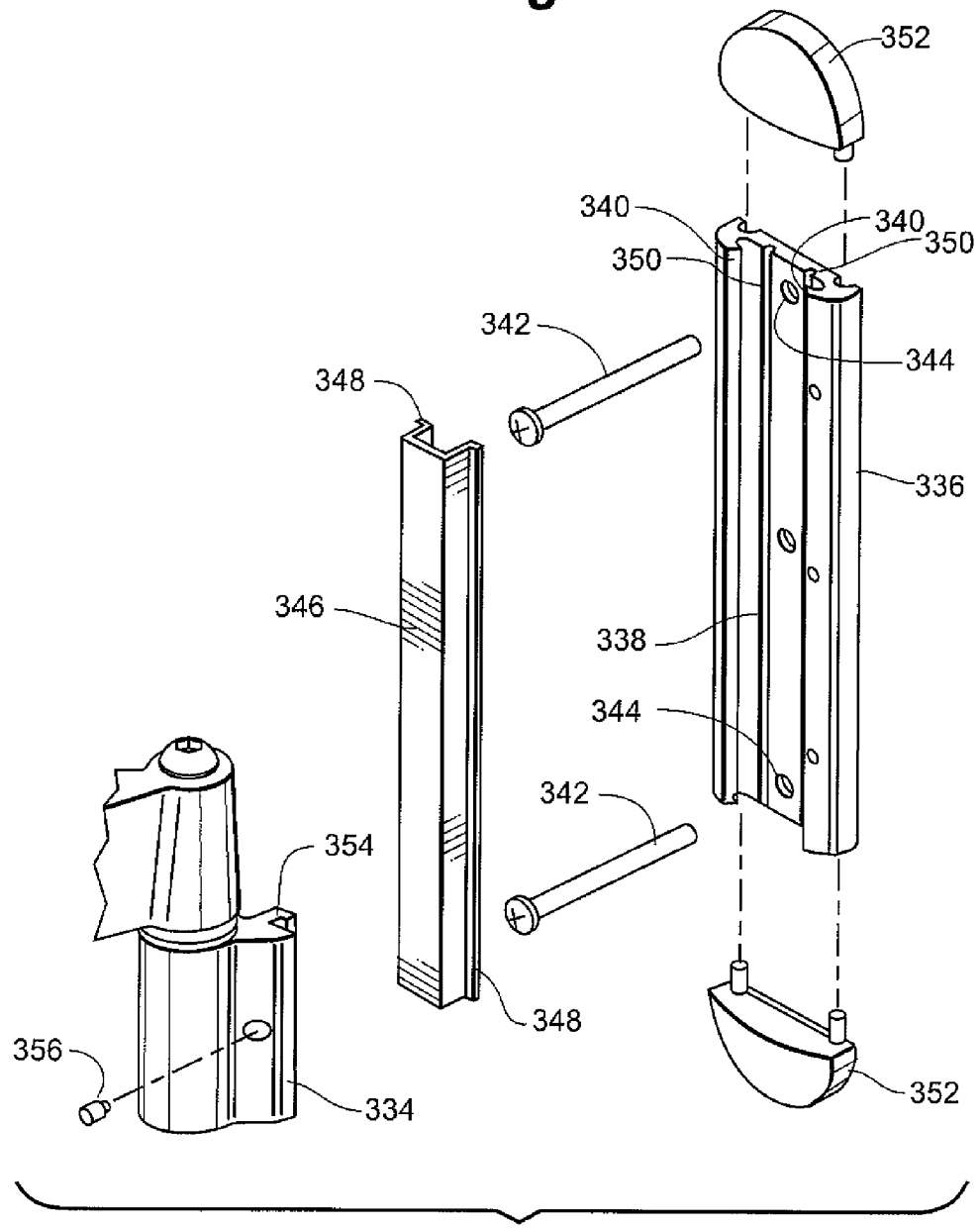
FIG. 13 is a fragmentary exploded perspective view of the mounting bracket assembly of an embodiment of the present invention.

Mounting bracket assembly 302 is depicted in FIG. 13, and generally includes bracket portion 334 and hanger plate 336. Hanger plate 336 has longitudinal recessed portion 338 with a pair of inwardly facing grooves 340. Hanger plate 336 may be secured to a fixed structure, such as a wall, using fasteners 342 inserted through apertures 344. Optionally screw cover 346 may be used to cover fasteners 342 for aesthetic purposes by engaging laterally projecting flanges 348 in inner grooves 350 of hanger plate 336. Further end caps 352 may be used to cover the ends of hanger plate 336 to further enhance the appearance of the installation. Bracket portion 334 has a pair of recesses 354 which slidably engage with grooves 340 to secure bracket portion 334 to hanger plate 336 and to enable the position of bracket portion 334 to be adjusted to any location longitudinally along hanger plate 336. Once bracket portion is in a desired position, set screw 356 may be tightened to secure bracket portion 334 in place.

A swing arm, such as inner arm 298, may be secured to mounting bracket 334 with the same arrangement as described above for connecting inner arm 298 with outer arm 300. Bracket portion 334 has an upwardly directed bore 358. Shaft 360 is received in bushing 362 fitted in bore 358 and extends upwardly therefrom. Bore 364 in proximal end 366 of inner arm 298 has a downwardly directed enlarged portion which receives shaft 360 in a bushing 368. Bolt 370 extends through inner arm 298 and bracket portion 334 and receives nut 372.

What is claimed is:

1. An adjustable flat panel electronic display system adapted for mounting on a non-horizontal fixed structure, the system comprising:
   a support structure adapted to attach to the fixed structure;
   a flat panel electronic display device;
   a device interface portion for receiving the flat panel electronic display device thereon, the device interface portion including a frusto-spherical portion having an inner surface, an outer surface, and a flange portion extending radially outwardly from the frusto-spherical portion, the flange portion having structure defining at least one aperture for receiving a fastener to couple the device interface portion with the flat panel electronic display device, the frusto-spherical portion having structure defining an aperture and presenting an aperture periphery;
   a guide structure operably coupling the device interface portion and the support structure, the guide structure including a first bearing portion frictionally engaging and guiding the outer surface of the frusto-spherical portion and a retaining portion frictionally engaging and guiding the inner surface of the frusto-spherical portion so as to retain the device interface portion in engagement with the first bearing portion, the first bearing portion and the retaining portion together exerting a clamping force on the frusto-spherical portion, the retaining portion selectively adjustably shiftable relative to the first bearing portion to vary the amount of clamping force exerted on the frusto-spherical portion by the first bearing portion and the retaining portion; and
   a friction adjustment mechanism including a rotatable friction adjustment knob presenting a periphery and having a plurality of finger-grippable indentations arranged around the periphery, the friction adjustment knob threadedly engaged with the retaining portion to selectively shift the retaining portion when the friction adjustment knob is rotated, whereby the amount of friction resisting movement of the frusto-spherical portion relative to the first bearing portion and the retaining portion is selectively adjustable with the friction adjustment knob.

2. A self-balancing adjustable flat panel electronic display system adapted for mounting on a non-horizontal fixed structure, the system comprising:
   a support structure adapted to attach to the fixed structure;
   a flat panel electronic display device;
   a device interface portion for receiving the flat panel electronic display device thereon, said flat panel display device having a center of gravity, said device interface portion including a frusto-spherical portion having an outer surface with a generally constant radius of curvature and a flange portion extending radially outwardly from the frusto-splierical portion, the flange portion having structure defining at least one aperture for receiving a fastener to couple the device interface portion with the flat panel electronic display device, the radius of curvature of the frusto-spherical portion defining a center proximate the center of gravity of the flat panel display device;

a guide structure operably coupling said device interface portion and the support structure, said guide structure having a first bearing portion frictionally engaging and guiding the outer surface of said frusto-spherical portion and a retaining portion for retaining said device interface portion in engagement with said first bearing portion, wherein the flat panel electronic display device is selectively rotatably positionable in roll, pitch, and yaw, about the center of the radius of curvature of the frusto-spherical portion with substantially equal effort; and means for selectively adjusting an amount of frictional force between the first bearing portion and the outer surface of the frusto-spherical portion.

3. The display system of claim 2, wherein the means for selectively adjusting an amount of frictional force between the first bearing portion and the outer surface of the frusto-spherical portion includes a control operably coupled with the retaining portion, and wherein the retaining portion is selectively shiftable with the control.

4. The display system of claim 3, wherein the control is a rotatable knob.

5. The display system of claim 4, wherein the rotatable knob has a plurality of finger grippable structures.

6. The display system of claim 2, wherein the frusto-spherical portion comprises a hollow shell having an inner surface, the guide structure further comprising a second bearing portion engaging and guiding the inner surface of the hollow shell.

7. The display system of claim 6, wherein said second bearing portion slidably engages said inner surface of said frusto-spherical portion.

8. A self-balancing adjustable flat panel electronic display system adapted for mounting on a non-horizontal fixed structure, the system comprising:

a support structure adapted to attach to the fixed structure;

a flat panel electronic display device defining a center of gravity;

a device interface portion for receiving the flat panel electronic display device thereon, the device interface portion including a frusto-spherical portion having an outer surface with a generally constant radius of curvature and a flange portion extending radially outwardly from the frusto-spherical portion, the flange portion having structure defining at least one aperture for receiving a fastener to couple the device interface portion with the flat panel electronic display device, the frusto-spherical portion having structure defining an aperture and presenting an aperture periphery, the radius of curvature defining a center proximate the center of gravity, the weight of the flat panel electronic display device acting through the center of gravity exerting a moment force on the support structure; and a guide structure operably coupling the device interface portion and the support structure, the guide structure having a first bearing portion engaging and guiding the outer surface of the frusto-spherical portion and a non-resilient retaining assembly arranged so as to apply a biasing force for holding the device interface portion in engagement with the first bearing portion, the guide structure including a portion extending through the aperture in the device interface portion, the portion of the guide structure extending through the aperture in the frusto-spherical portion having an outer surface spaced apart from the aperture periphery in all radial directions when the device interface portion is positioned so that the portion of the guide structure extending through the aperture in the frusto-spherical portion is at the center of the aperture in the frusto-spherical portion, wherein the flat panel electronic display device and device interface portion are selectively rotatably positionable about the center of the radius of curvature of the frusto-spherical portion in all rotational directions with substantially equal effort.

9. The display system of claim 8, wherein the non-resilient retaining assembly includes a control for varying a magnitude of the biasing force.

10. The display system of claim 9, wherein the control is a rotatable knob.

11. The display system of claim 10, wherein the rotatable knob has a plurality of finger grippable structures thereon.

12. The display system of claim 8, wherein the frusto-spherical portion comprises a hollow shell having an inner surface, the guide structure further comprising a second bearing portion engaging and guiding the inner surface of the hollow shell.

13. The display system of claim 12, wherein the second bearing portion slidably engages the inner surface of said frusto-spherical portion.

* * * * *